United States Patent [19]

Jensen et al.

[11] Patent Number: 4,518,313
[45] Date of Patent: May 21, 1985

[54] WIND BLADE VIBRATION ELIMINATOR FOR HELICOPTERS

[76] Inventors: Ronald N. Jensen, 208 Greenwell Dr.; John A. Walker, 1005 Todds La., both of Hampton, Va. 23666

[21] Appl. No.: 352,228

[22] Filed: Feb. 25, 1982

[51] Int. Cl.³ ........................ F03D 7/02; B64C 27/72
[52] U.S. Cl. ........................................ 416/18; 416/60
[58] Field of Search ................ 416/18, 22, 60, 60 A, 416/145, 99

[56] References Cited

U.S. PATENT DOCUMENTS

| | | | |
|---|---|---|---|
| 2,474,359 | 6/1949 | Isacco | 416/22 |
| 2,547,721 | 4/1951 | Stalker | 416/18 |
| 2,941,600 | 6/1960 | Koning et al. | 416/22 |
| 3,186,491 | 6/1965 | Fischer | 416/22 X |
| 3,482,803 | 12/1969 | Lindenbaum | 416/22 X |
| 3,610,555 | 10/1971 | Nagler | 416/22 X |
| 4,297,076 | 10/1981 | Donham et al. | 416/36 |
| 4,302,152 | 11/1981 | Jensen | 416/18 |
| 4,355,955 | 10/1982 | Kisovec | 416/23 |

FOREIGN PATENT DOCUMENTS 681382 10/1952 United Kingdom ................ 416/18

Primary Examiner—Everette A. Powell, Jr.

[57] ABSTRACT

An improvement to a rotating blade is disclosed in a device that will apply variable moment forces to wind blades which are counter to the variable forces normally encountered in typical wind blades. The device consists of a gyro attached to the rotating blade and because of the torque force obtained by gyroscopic precession, the device will provide moment forces counter to normal blade wind forces. This invention shows a unique arrangement where the gyro is attached to the blade by a gyro positioner which adjusts the gyro's precessional rate. The gyro's precessional rate is varied with the blade's deflection or blade stress so that the gyro will impose a moment force counter to the cyclic deflection in the blade. Thus the device prevents or reduces the vibrational deflection and resultant stresses in the blades and its associated structures.

10 Claims, 6 Drawing Figures

WIND BLADE VIBRATION ELIMINATOR FOR HELICOPTERS

BACKGROUND

1. Field of the Invention

This invention relates to wind blades and specifically to a device rotating helicopter airfoils or wind blades that will reduce in the wind blade and its related structure. The device as presented, imposes variable moment forces to the blade which are induced by a gyro which has an adjustable precessional rotational rate. The invention is shown applied to helicopter blades.

2. Cross Reference to Related Applications

This invention uses the concept of gyro moment forces to introduce torque forces which are counter to the normal blade forces. An earlier patent, U.S. Pat. No. 4,302,152, describes a constant moment gyro device used on windmills to impose a counter force on an airfoil. The reference Patent does not however provide a means to vary the counter moment force.

3. Discussion of Prior Art

Wind blades are subject to cyclic forces. Cyclic forces produce unwanted blade deflection and vibrations. Vibrations can seriously degrade service life of the equipment by overstressing, fatigue, and wear of components.

In windmills, a cyclic force on the blade is caused by the wind shadow from the supporting structure. This often requires the use of "before the structure" wind blades which increases the orientation problems of the windmill system.

In helicopters, the cyclic forces are the result of:
(a) various lifting forces on the blades since the blade speed differs in respect to still air due to the aircraft's horizontal movement, by
(b) the blade pitch changes imposed for directional control, by
(c) air movements from or to the associated structures, and by
(d) agitating ground resonance.

Cyclic force vibrations are one of the major factors limiting speed of forward flight for helicopters. Secondary vibrations within the body of the aircraft are also a major concern and require absorbing components to limit their influence.

A basic method to reduce the metal stresses in blades is to provide heavier and thicker blades. This approach introduces unwanted weight and air drag to the system. Others have reduced vibrational stresses in rotating members by using "flapping hinges" on the blade/rotor assembly. Other "tuning" or vibrational damping devices have been used on blades and within associated structures. These devices add significantly to the weight and complexity of the aircraft.

Gyros or gyroscopes are weighted spinning bodies. They are well understood and their associated forces can be mathematically determined. Gyros have been used in positional control devices such as pitch control in ships. Precession is the term used for the turning of a gyro's axis. It is the characteristics of a gyro that as the gyro is precessed, it produces a torque at right angles to the precession. The torque from the precession, is proportional to the spinning speed of the gyro and the rotational rate of the precession.

SUMMARY OF THE INVENTION

According to the present invention, a variable precessioned gyro is attached to the wind blade. The gyro's spinning axis is normally in-line with the blade's length. As the blade turns the gyro is precessed, producing a torque or moment force that is directed 90° to the precession of the gyro or directly counter to the normal wind forces applied to the blade. This invention considers the dynamic cyclic forces on the blade as it rotates and is subjected to cyclic stresses, deflection and vibration. As a deflection is measured, the gyro positioner is adjusted so that the gyro torque forces are added to or relieved from the blade by adjusting the rate of gyro precession. Variable precessional rates are achieved by pivoting the gyro using a positioning device. The applied force reqired to position the gyro is directed against the wind blade's wide cross-section instead of the narrow section and thus the applied forces becomes a minor element in the blade's total stress or deflection.

DESCRIPTION OF THE PREFERRED EMBODIMENT

Figure 1:
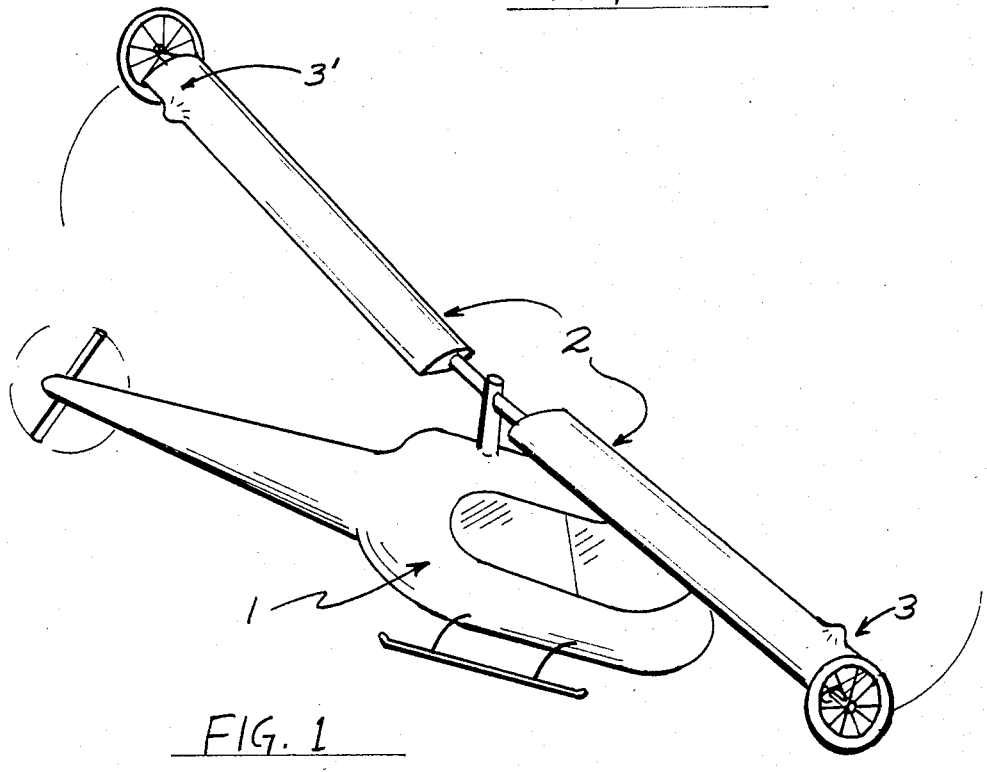
FIG. 1 is a schematic of the device as it would be applied to a helicopter blade.

Referring to the figures, there is shown the preferred embodiment of the invention as it would be applied to limit vibrations in helicopter blades. As seen in FIG. 1, helicopter 1 has rotating wind blades 2 and attached to the said blades are two gyro assemblies 3 and 3'.

Figure 2:
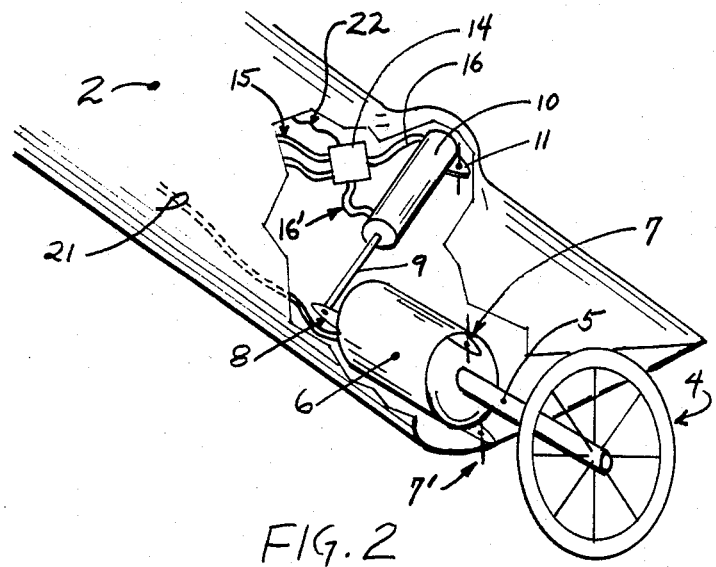
FIG. 2 is a detailed schematic of the gyro assembly.

In FIG. 2, there is shown the details of the gyro assembly 3. The assembly consists of the gyro 4 attached to the power shaft 5 and the rotating motor 6. The assembly is allowed to pivot in respect to the blade from pivot point 7 and 7'. Positioning is accomplished from the force applied to the connecting positioner's point 8 and the positioner's connecting shaft 9, which moves in respect to the positioner's power device 10. The positioner's power device 10 is attached to the blade 2 with a positioner's device pivot 11. The rotating motor is driven with an electric, hydraulic or pneumatic power source transmitted through the power line 21. The positioner's power device is operated from a control signal in the control signal line 22 which controls a transducer 14 which in turn, controls the electric, hydraulic or pneumatic power from the control power line 15.

Figure 3:
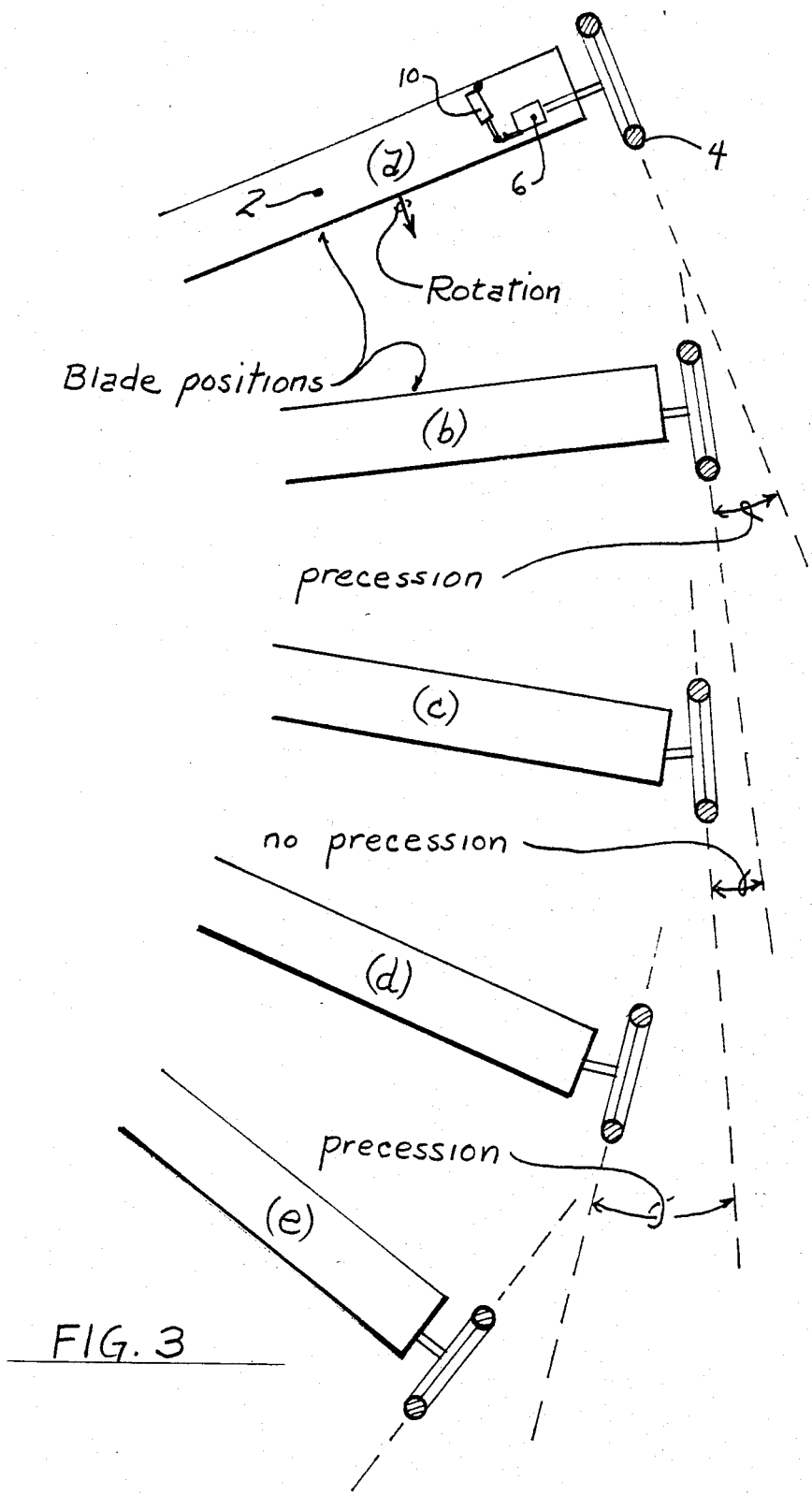
FIG. 3 represents action of the gyro's position as a function of time.

In FIG. 3, there is shown a sequence of gyro positions in respect to time, and the drawing is used to describe the assembly's action in various positions in the Operation paragraph. The positional action may be a predetermined sequence or by controlled means shown in FIGS. 4 and 5.

Figure 4:
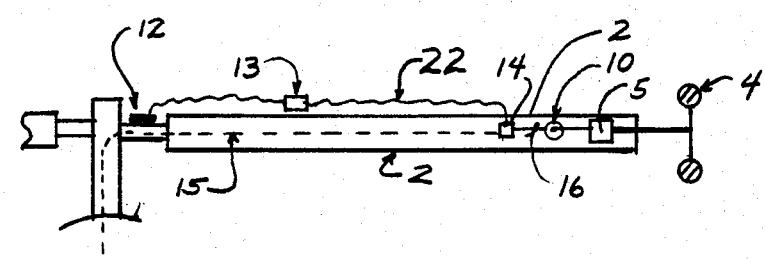
FIG. 4 details a strain gage measurement method for the gyro positioner.

In FIG. 4, there is shown a gyro positioning device control. It uses a strain gage 12 which modifies a signal which indicates the blade's strain or deflection and which is enhanced in the amplifier device 13. The corrective signal is transmitted to a transducer 14 through the control signal line 22. The positioner power can be hyraulic, pneumatic or electric, and is transmitted through the control power line 15 to the said transducer 14, and through flexible connecting lines 16 and 16' as a positioning signal for the positioner's power device 10.

Figure 5:
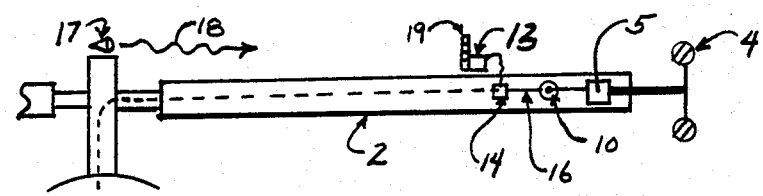
FIG. 5 details a laser light measurement method for the gyro positioner.

In FIG. 5, there is shown a gyro positioning method using a laser light device. In this arrangement, a laser beam source 17 is attached to the blade and its light beam 18 is directed to a laser sensor 19. The laser sensor uses a series of light sensitive elements that can be used to indicate the position of the laser light beam on the sensor and to produce a corrective signal that is directed to the correction amplifier 13 and onto the signal transducer 14. A corrective signal is sent to the positioner's power device 10 which will control the gyro precession and thus the blade's deflection.

Figure 6:
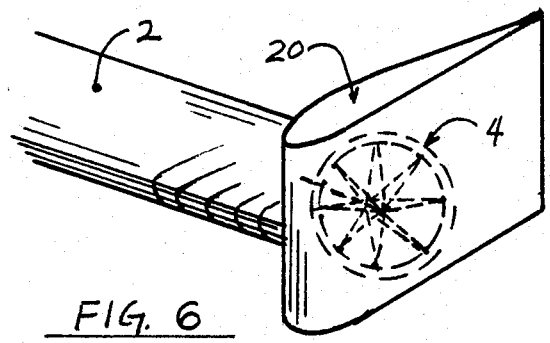
FIG. 6 shows a coverlet for the gyro wheel.

In FIG. 6, there is shown a coverlet 20 over the gyro.

OPERATION

As wind blades rotate, varying or cyclic forces are imposed on the blade. Blades deflect due to the said imposed blade forces and the deflection is aggravated by the natural resonance of the blade. The result is unwanted vibrations that produce high blade stresses. The operation of this invention depends on the moment or torque that can be imposed on a wind blade from the precession of a gyro. Normal blade forces can be countered by the moment force from a gyro attached to the blade and resulting from the precessional rate of the gyro. The cyclic or variable forces can be countered by a variable torque induced by varying the precessional rate of the gyro.

In this invention, the control of the positioner may be predetermined or the bladed deflection can be measured and the positioner controlled with a strain gage method as shown in FIG. 4 or a laser sensor method as shown in FIG. 5. The input signal can be electronically modified in the signal amplifier with corrections for blade rotational position, gyro's position, system time response, and rate of change of the deflection. The developed signal can then be sent to the positioner to vary the rate of precession of the gyro.

An example of the invention's operation is described in sequence diagrams of FIG. 3. At time period (a) the gyro's spin axis is shown in line to the axis of the blade. As the blade is rotated from position (a) to position (b), the gyro is precessed. A torque force is imposed on the blade, 90° to the precessional rotation of the gyro and counter the normal moment forces on the blade.

Between position (b) and (c), it is demonstrated a reduction of blade forces which allows the blade (on a helicopter) to flap downwards. This may be the result of the change of respective speed of the blade in the air, wind shadow, control pitch, or such. This deflection is measured by the blade's deflection sensor and a corresponding signal is sent to the positioner's power device. The assembly will then be rotated to effectively slow down the gyro's precession and thus reducing the gyro's torque force thereby maintaining a more constant blade total moment force and reducing the deflection caused by the cycling forces on the blade.

As the blade moves to position (d) and (e), and is again subjected to a more typical blade force, the new deflection is sensed. A signal is sent to the positioner and the gyro is fixed into position in respect to the blade or is forced back into the original position in respect to the blade. Either will apply a strong counter torque on the blade.

The coverlet can be provided to cut air drag. The coverlet can also be used to reduce blade tip air vortices and the coverlet can be pitched to induce extra air over the wind blades and thus improve blade performance.

It will be understood that the foregoing description is the preferred embodiment of the invention and is therefore merely representative. Obviously, there are many possible variations and modifications of the present invention in light of the above teachings. For example:

1. A combined motor and gyro wheel.
2. Various positions and mounting arrangements of the gyro assembly on the blades.
3. A gyro wheel shaped to limit air drag.

What I claim is:

1. In combination with a helicopter airfoil, a vibration eliminator attached to said airfoil and consisting of a pivoted gyro positioned with the gyro rotating axis nominally parallel to the length of the airfoil and the gyro pivot axis generally parallel to the airfoil rotaing axis, means to impose rotation to said gyro,
    means to position said gyro relative to said airfoil, and
    means to provide control signal to the means to position said gyro,
    whereby the variable torque forces caused by the variable precession gyro can be transmitted to said airfoil and said means to position gyro varies said gyro axis relative to said airfoil thereby changing the rate of precession in response to said control signal, counteracting various bending forces on said airfoil caused by various velocities of said airfoil through the air.

2. A vibration eliminator according to claim 1 where said means to impose rotation to said gyro consists of an electric motor connected to said gyro, and means to provide electrical power to said electric motor,
    whereby said electric power drives said motor and motor rotation imparts rotational momentum to the said gyro.

3. A vibration eliminator according to claim 1 where said means to impose rotation to said gyro consists of a hydraulic motor connected to the said gyro, and means to introduce power fluid to the said hydraulic motor,
    whereby said power fluid activates said hydraulic motor imparting rotational motion to said gyro.

4. A vibration eliminator according to claim 1 including a pneumatic driven motor connected to said gyro and, means to provide pneumatic power to said motor,
    whereby said pneumatic power will impart rotation to said gyro through said pneumatic motor.

5. A vibration eliminator according to claim 1 where said means to position said pivoted gyro consists of pneumatic driven cylinder and piston, attached to said pivoted gyro and to the airfoil, means to provide controlled pneumatic signal to said pneumatic driven cylinder,
    wherein when said pneumatic signal is imposed to said pneumatic driven cylinder the relative movement between the airfoil and said pivoted gyro results in a change of precessional rate of said gyro.

6. A vibration eliminator according to claim 1, where said means to provide control signal to the gyro consists of a strain gauge attached to the airfoil and, means to enhance the strain gauge signal, and transducer means to convert said enhanced strain gauge signal into a gyro position control signal, whereby said pivoted gyro can be positioned relative to the airfoil and in response to the airfoil bending as sensed through said strain gauge, said means to enhance the strain gauge signal, and said transducer.

7. A vibration eliminator of claim 1 where said means to provide control signal consists of laser light source means secured to said airfoil and a multipoint laser light sensor means attached to a second point on said airfoil, means to convert a multipoint laser light sensor signal to a gyro control signal, whereby as said airfoil bends the light is repositioned on said multipoint laser light sensor, the sensitive points on said multipoint laser light sensor are sequentially activated and the resulting signal is modified by signal conditioners to provide an input signal to said means to position said gyro.

8. A vibration eliminator accordng to claim 1 including a signal conditioner means that produces output control signal for the said means to position gyro, means to provide input signal conditions, means to combine said input signal with the blade's rotational position, the gyro's position, and rate of vertical airfoil change, whereby the data is translated into said signal for said means position said gyro that minimizes vibration of the airfoil.

9. A vibration eliminator according to claim 1 including a coverlet enclosing said gyro and attached to said airfoil, whereby the air drag of said gyro is reduced.

10. In combination with an aircraft rotating windblade, a variable moment device consisting of rotating weighted wheel attached to said windblade, means to adjust the axis of said rotating weighted wheel relative to the windblade in proportion wih measured or anticipated windblade vertical movement, wherein the spinning axis of said rotating weighted wheel axis is moved in the plain of the windblade rotation and at various rates in respect to the rotating windblade causing a variable vertical torque on the windblade thereby reducing various vertical movement of the windblade.

* * * * *